Figure 1:
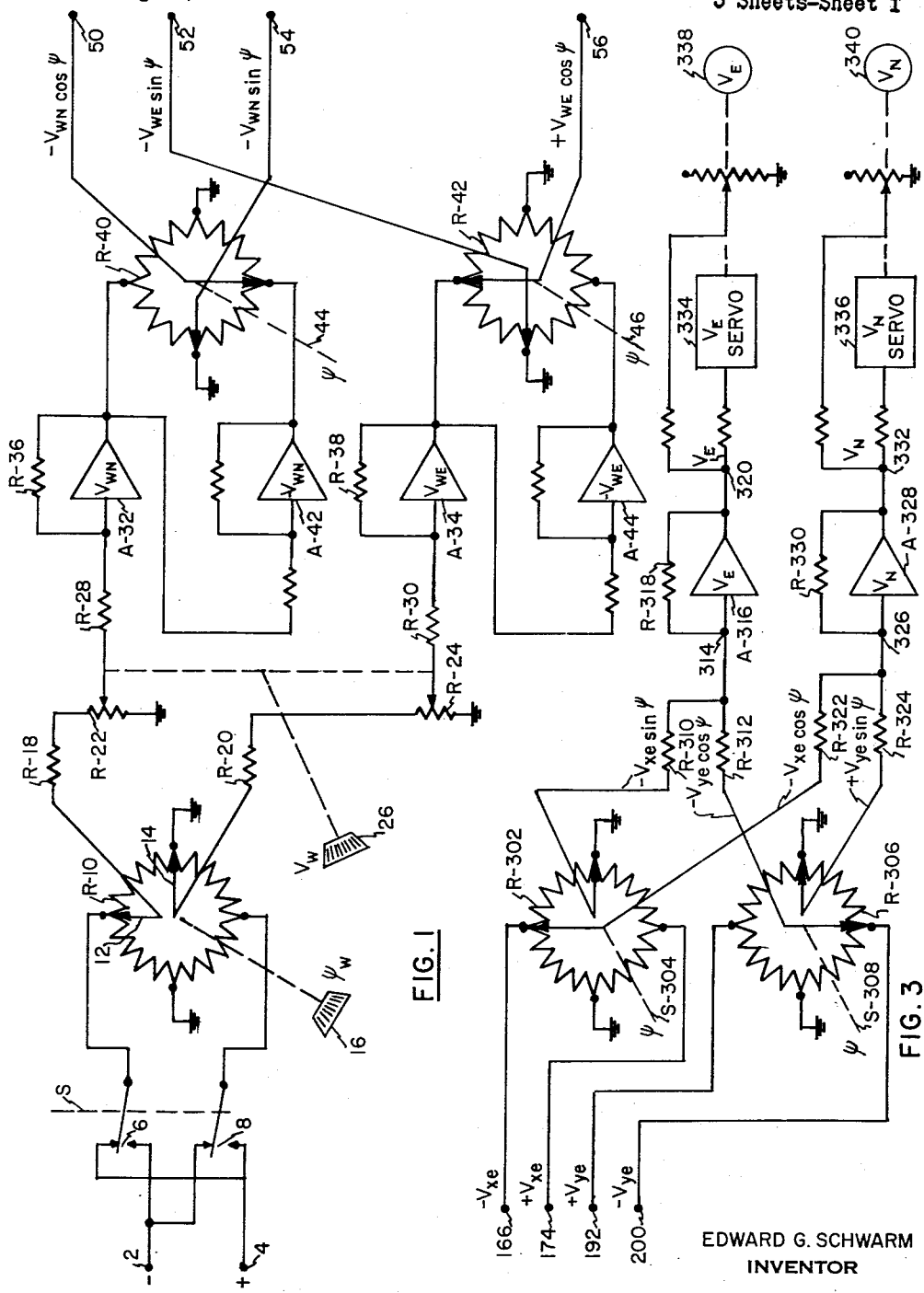

Oct. 10, 1961    E. G. SCHWARM    3,003,252
SYSTEM OF GROUND COORDINATE DETERMINATION IN A FLIGHT TRAINER
Filed Aug. 5, 1958    3 Sheets-Sheet 2

EDWARD G. SCHWARM
INVENTOR

BY Delbert P. Warner
ATTORNEY

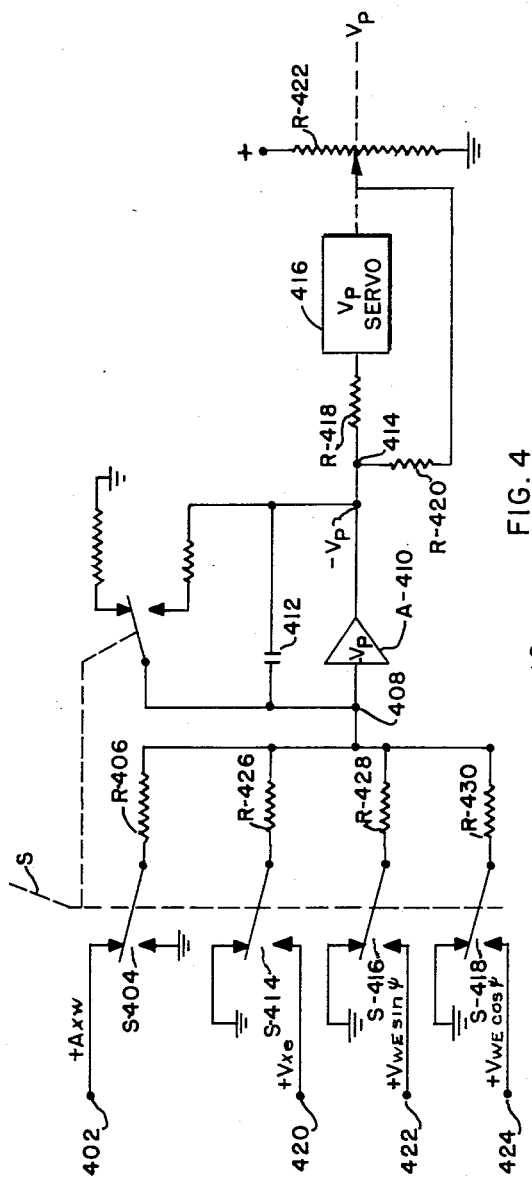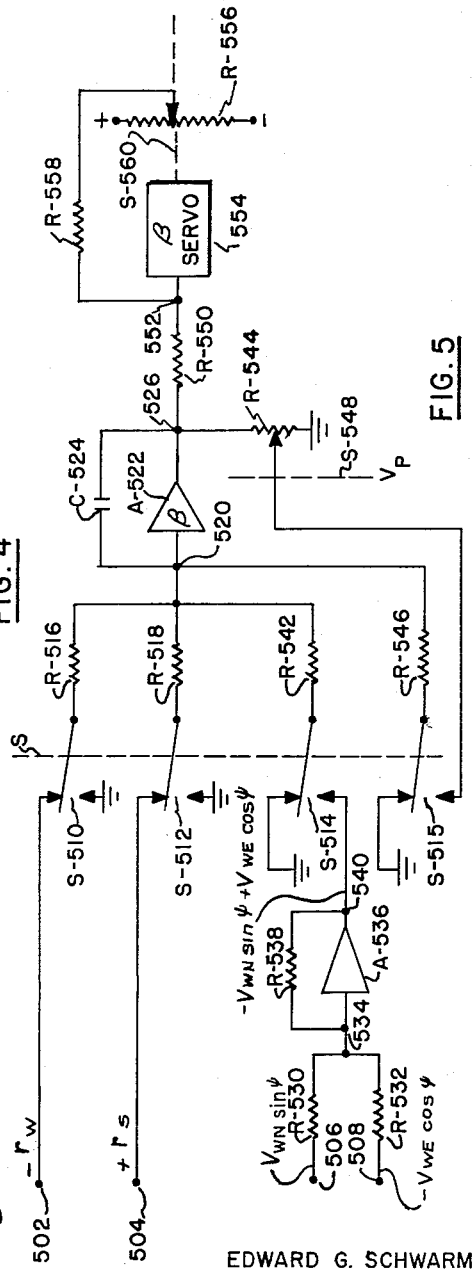

United States Patent Office 3,003,252
Patented Oct. 10, 1961

3,003,252
SYSTEM OF GROUND COORDINATE DETERMINATION IN A FLIGHT TRAINER
Edward G. Schwarm, Binghamton, N.Y., assignor to General Precision Inc., a corporation of Delaware
Filed Aug. 5, 1958, Ser. No. 753,325
15 Claims. (Cl. 35—12)

The present invention relates to aircraft simulators and more particularly to an improved method and means for computing ground coordinates for such simulators.

Many of the prior art computers required the computation of ground coordinates in connection with navigation and landing systems, but in general the permissible errors in such prior art devices were relatively large. None of the prior systems, insofar as is known, required that the position of the simulated aircraft be located with sufficient accuracy for use in simulators of certain modern high speed aircraft such as jet airliners.

The prior art devices did not require the accurate simulation of ground coordinates in some instances because the systems did not provide for landing the aircraft, and in other instances the systems did not require that the student pilot be called upon to make a simulated landing under circumstances in which the landing was associated with accurate visual approach and landing simulation devices.

The prior art apparatus generally has not involved consideration of the forces exerted on the simulated aircraft during ground operation, and it has not been necessary to obtain the true ground velocities on the earth in the direction of the projected aircraft X and Y axes. Modern high speed aircraft necessitates training in ground operating conditions through visual display equipment, as well as training in visual landing and takeoff and consequently these prior art devices have proven to be inadequate.

It is an object therefore, of the present invention to provide improved means for accurately determining the simulated ground coordinates of the position of a simulated aircraft during both ground and airborne simulated travel and any transitions therebetween.

It is a further object of this invention to provide the necessary factors of speed and position of an aircraft simulator to provide values for accurate computation of the simulated forces exerted by the ground against a simulated aircraft when it simulates landing, taking off, or taxiing on simulated runways or aprons.

It is another object of this invention to provide for the computation of ground coordinates of a simulated aircraft with sufficient accuracy to make it possible for a student pilot to control his simulator in such a way that he can make accurate approaches to a model airfield or to other visual approach equipment.

It is yet another object of this invention to provide ground coordinate determination apparatus, for use with flight simulators, of such accuracy and sensitivity to the controls of a simulated aircraft as to make possible the accurate guidance of the simulator while taxiing.

Other objects will be obvious and will become apparent as the description proceeds.

According to a preferred embodiment of my invention, I provide input voltages which may be suitably varied by handset potentiometers to provide voltages proportional to selected components of wind speed with reference to selected earth axes. These values are then resolved into components along the aircraft earth axes and are added algebraically to respective X and Y components of aircraft airspeed to provide outputs proportional to the ground velocity of the simulated aircraft along its X and Y earth axes. While simulating conditions of an aircraft on the ground, my invention utilizes voltages proportional to acceleration along respective X and Y axes of the simulated aircraft to generate outputs proportional to the ground speed of the aircraft along those axes. Provisions are made for the further resolution of the aircraft ground speed with respect to northerly and easterly coordinates on the earth's surface. Additional provisions are made for determining the ground velocity and ground coordinates of the simulated aircraft during and after landing and takeoff.

Figure 2:
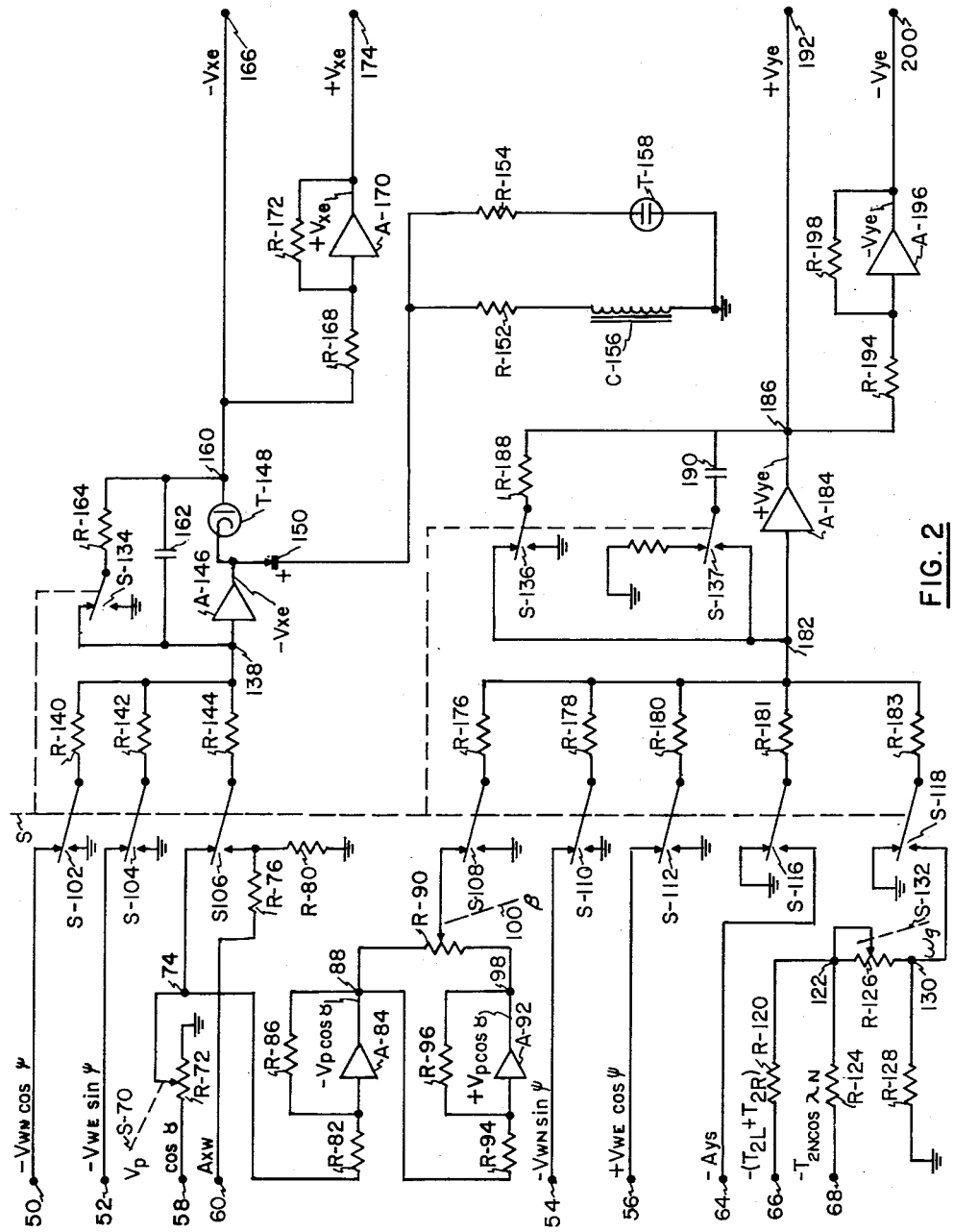

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIG. 1 is a drawing representing an exemplary embodiment of apparatus for providing voltages proportional to wind speed and wind heading relative to the ground and for resolving those values into voltages representing velocity along the simulated horizontal projections of the X and Y axes of an aircraft simulator, FIG. 2 is a schematic diagram of an exemplary embodiment of apparatus for combining simulated wind velocity and simulated aircraft velocity, under conditions representing the simulator in flight to generate potentials commensurate with the ground speed of the aircraft, and also of apparatus for generating potentials commensurate with ground velocity under conditions of acceleration when the simulated aircraft is in a condition representing motion with its weight on the ground, FIG. 3 is a schematic diagram illustrating means for converting a simulated aircraft quantity commensurate with velocities taken with respect to the ground projection of the aircraft axes into component quantities taken along north and east axes fixed with respect to the earth, FIG. 4 is a schematic diagram of apparatus for generating a computer quantity commensurate with simulated air speed, and FIG. 5 is a schematic diagram illustrating means for generating a voltage and a shaft position proportional to simulated sideslip angle.

One of the first requirements for aircraft simulators is the provision of suitable means by which an instructor can provide arbitrarily-selected simulated environmental conditions. Wind velocity and direction may be arbitrary conditions of this character, and accordingly means is shown in FIG. 1 for arbitrarily inserting voltages proportional to wind velocity and wind direction in the circuits. Voltages are impressed across terminals 2 and 4 of FIG. 1, which are of negative and of positive polarity, respectively, and will be understood to be of equal magnitudes below and above zero potential. Terminals 2 and 4 are connected through suitable conductors to pairs of contacts on switches 6 and 8 which may be closed by moving the associated switch arm either to upper or lower contacts. The control of the position of the switch arm associated with switches 6 and 8 is through a shaft S which closes either the upper or lower contacts depending upon whether the simulated aircraft is airborne or on the ground. When it is airborne, the switch arms connected with the shaft S will be shown as closed with switch contacts in the upper position throughout this disclosure. The potentials on terminals 2 and 4 are connected to a resolver R—10, through the upper contacts of switches 6 and 8, as shown, when the simulated aircraft is airborne. The potentials applied to the resolver R—10 are reversed, to facilitate certain computations, when the simulated aircraft is grounded, as will be further explained below.

The resolver R—10 is designed to provide output voltages proportional to sine and cosine functions of the input voltages through its wiper arms 12 and 14, the positions of which may be set by hand, with the hand setting device 16, according to the chosen wind direction $\psi_w$, the angle between simulated north and the direction in which the simulated wind is blowing. The voltages appearing on the wiper arms 12 and 14 are respectively proportional to the sin $\psi_w$ and the cos $\psi_w$. Potentials commensurate with these trigonometric functions of $\psi_w$ are transmitted through resistors R—18 and R—20 to excite linear potentiometers R—22 and R—24, respectively.

The wiper arms of potentiometers R—22 and R—24 may be hand set with the knob 26 in accordance with the selected wind speed $V_w$. The voltages appearing on the wiper arms of potentiometers R—22 and R—24 will then be proportional to $V_w \sin \psi_w$ and $V_w \cos \psi_w$, respectively, the components of wind velocity in east-west and north-south directions. Those component voltages are fed through resistors R—28 and R—30 to the input terminals of amplifiers A—32 and A—34, respectively, which are provided with stabilizing feedback resistors R—36 and R—38. These amplifiers provide output voltages proportional to quantities:

$$V_w \sin \psi_w \qquad (1)$$
and
$$V_w \cos \psi_w \qquad (2)$$

which may be rewritten with different subscripts to show that quantities (1) and (2) represent wind velocity with respect to chosen east-west and north-south axes, as follows:

$$V_w \sin \psi_w = V_{WE} \qquad (3)$$
$$V_w \cos \psi_w = V_{WN} \qquad (4)$$

The output of amplifier A—32 is fed to one terminal of a resolver R—40 and to the input terminal of an amplifier A—42. The amplifier A—42 provides a 180° phase or polarity reversal of the voltage appearing on its input terminal to excite a second terminal of the resolver R—40. The output of amplifier A—34 is similarly fed directly to one terminal of a resolver R—42 and through a phase-reversing amplifier A—44 to another terminal of the resolver R—42. Resolvers R—40 and R—42 provide output voltages, through their wiper arms, which are trigonometric functions of the aircraft heading $\psi$. The shafts 44 and 46 position the wiper arms according to aircraft heading $\psi$ in response to computer shaft positions.

The output voltages from the wiper arms of potentiometers R—40 and R—42 are fed to terminals 50, 52, 54, and 56. The voltages applied to these terminals are therefore proportional to the following quantities:

$$-V_w \cos \psi_w \cos \psi \qquad (5)$$
$$-V_w \sin \psi_w \sin \psi \qquad (6)$$
$$-V_w \cos \psi_w \sin \psi \qquad (7)$$
$$+V_w \sin \psi_w \cos \psi \qquad (8)$$

which may be rewritten, substituting from Equations (3) and (4), as follows:

$$-V_{WN} \cos \psi \qquad (9)$$
$$-V_{WE} \sin \psi \qquad (10)$$
$$-V_{WN} \sin \psi \qquad (11)$$
$$+V_{WE} \cos \psi \qquad (12)$$

These voltages represent the projection of wind velocity along instantaneous earth projections of the X and Y body axes of the aircraft, respectively; the values appearing on terminals 50 and 52 being respective magnitudes along the earth projection of the aircraft X axes, and the values appearing on terminals 54 and 56 being the values perpendicular to the X axis or along the earth projection of the aircraft Y axis. It will be recognized that the polarity of the potentials appearing on terminals 50, 52, 54 and 56, as represented by expressions (9), (10), (11) and (12), will be reversed in the event that the simulated aircraft lands and the lower switch contacts associated with shaft S are closed. This reversal of polarity is a matter of convenience for machine computations, as is pointed out hereinafter.

It should be emphasized that the description thus far has reference primarily to the generation of voltages proportional to wind velocity for a simulator operating in its airborne mode only. When the simulator is not airborne, the polarity of the voltage on terminals 50, 52, 54 and 56 will be reversed for computational purposes.

FIG. 2 illustrates apparatus to combine the components of wind velocity algebraically with horizontal projections of the simulated airspeed of the simulator in order to derive voltages proportional to ground speed. The apparatus of FIG. 2 is designed to provide voltages proportional to groundspeed, whether the simulator is airborne or not, and to switch swiftly and accurately from the airborne mode to the ground mode and back again. The input voltages representing wind velocity on terminals 50, 52, 54 and 56 are the same as the voltages appearing on the like numbered terminals of FIG. 1.

The voltages appearing on the other input terminals of FIG. 2, i.e., terminals 58, 60, 64, 66 and 68, are proportional to other computer functions which may be supplied by other computer elements. The voltage which appears on terminal 58 is proportional to the cosine of the flight path elevation angle (cos $\gamma$), a quantity which would normally be available in many aircraft simulators, and which is applied to the input terminal of a potentiometer R—72. A shaft position proportional to airspeed ($V_p$), as measured along the wind axis X, is provided through a shaft S—70, which serves to position the wiper arm of the potentiometer R—72 to provide an output proportional to $V_p \cos \gamma$ which represents the simulated airspeed projected on the earth axes, i.e., horizontal airspeed. An analog of airspeed ($V_p$) is normally available in aircraft simulators or it may be taken from an output terminal of the instant invention, such as that shown in FIG. 4, as a voltage to operate a position servo and thus actuate the shaft S—70. The voltage $V_p \cos \gamma$ is applied from the wiper arm of potentiometer R—72 directly to the upper contact of switch S—106 for application to further parts of the circuit when the simulated aircraft is airborne.

The input voltage to terminal 60 is proportional to $A_{xw}$, which represents the acceleration of the aircraft along its longitudinal or X wind axis, the axis of instantaneous aircraft velocity. This voltage is applied through a resistor R—76 to excite resistor R—80 and to the lower contact of switch S—106. The generation of a voltage representing $A_{x_w}$ is set forth in detail in my copending application, Ser. No. 773,341, now abandoned, entitled "An Improved Solution of Euler Angles and Velocities for Flight Simulators" which was filed on November 12, 1958.

The voltage proportional to $V_p \cos \gamma$, corresponding to the earth axis projection of airspeed appearing as the output of potentiometer R—72 at the terminal 74, is fed through a resistor R—82 to an amplifier A—84, which has a conventional feedback resistor R—86, to provide a stabilized output voltage proportional to $-V_p \cos \gamma$. This voltage is applied directly at one terminal 88 of a potentiometer R—90, and through a phase-reversing amplifier A—92, which has the usual input and feedback resistors in its circuit as shown at R—94 and R—96, to terminal 98 of the potentiometer R—90. The wiper arm of the potentiometer R—90 is positioned by a shaft 100 to provide a voltage proportional to $V_p \beta \cos \gamma$, which will be positive or negative, depending upon the position of the wiper arm on the potentiometer R—90. The value $\beta$ represents the side slip angle, and is a computer or simulator function available in other simulators, but which has been accurately derived for use herewith as shown in FIG. 5. The output of $V_p \beta \cos \gamma$ is applied to the upper contact of a switch S—108 where it represents the lateral component of airspeed projected on the earth axes.

The expression $V_p \beta \cos \gamma$ may be derived from the following general equation:

$$V_{y_{e_{aero}}} = V_p \cos \gamma (\sin \beta \cos \phi - \sin \alpha \sin \phi) \quad (13)$$

where $$V_{y_{e_{aero}}}$$

represents the airspeed of an airplane with respect to the Y axis of its earth axes, the earth axes being a horizontal projection of the stability axes, $V_p \cos \gamma$ represents airspeed projected on the earth X-axis, $\sin \beta \cos \phi$ represents a correction for airspeed in the Y axis which takes side slip angle $\beta$ and roll angle $\phi$ into account, and $\sin \alpha \sin \phi$ represents a correction for angle of attack and roll.

Equation (13) may be simplified by taking into account the fact that $\beta$ is small and also that perturbations from level flight are small, so that $\sin \beta = \beta$ in radians, $\cos \phi = 1$ and $\sin \alpha \sin \phi$ approaches zero, from which the equation becomes:

$$V_{y_{e_{aero}}} = V_p \beta \cos \gamma \quad (14)$$

A voltage proportional to the lateral acceleration of the simulated aircraft on the ground, or more accurately, the lateral acceleration with respect to the earth projection of the stability axes (where the subscripts $y_s$ define motion along the Y stability axis) is provided at terminal 64. This value of lateral acceleration on the ground is labeled $-A_{ys}$ and appears on the lower contact of switch S—116 from which it may be applied to the simulator when the aircraft has weight on its wheels or is operating in its ground mode. The quantity $A_{ys}$ must be multiplied by $\cos \beta$, but $\beta$ is usually zero or nearly zero in normal flight so $\cos \beta$ reduces to 1 and may be dropped.

The input voltages applied on terminals 66 and 68 are proportional to the lateral forces which may be applied to the landing wheels of an aircraft while it is on the ground. The voltage applied to terminal 66 is proportional to $-(T_{2L}+T_{2R})$, where $T_{2L}$ and $T_{2R}$ are the sidewise, or laterally acting components of the left and right wheel thrusts, due to forces between the aircraft main gear left and right wheels and the ground. This voltage is applied through a resistor R—120 to a terminal 122. The force supplied to the nose wheel or wheels is represented by a voltage applied on terminal 68 and from there through a resistor R—124 to a terminal 122. A voltage divider comprising resistors R—126 and R—128 is provided between terminal 122 and ground with a terminal 130 between the resistors from which a voltage may be applied to the lower contact of switch S—118. The wiper arm of potentiometer R—126 may be adjusted by shaft S—132 according to the weight of the aircraft to divide the output from terminal 122 by the weight of the aircraft, so that the voltage on the lower contact of switch S—118 represents a differential proportional to the total lateral force on the wheels of the aircraft divided by the weight of the aircraft. This quantity, of course, represents lateral acceleration due to the sidewise-acting wheel forces on the simulated aircraft.

With the shaft S in the "airborne" or upward position, the various switches associated therewith will be closed on their upper contacts as indicated throughout the drawings and the disclosure; and, in particular, switches S—102, S—104, S—106, S—108, S—110, S—112, S—116, S—118, S—134, S—136 and S—137 will be positioned against their upper contacts to permit the application of voltages representative of airborne conditions to the appropriate amplifiers in FIG. 2.

The longitudinal component of the northerly component of wind velocity voltage, which is present at terminal 50, and the longitudinal component of the easterly component of wind velocity voltage, which is present at terminal 52, and the horizontal component of airspeed voltage present at terminal 74 are all applied during "airborne" conditions through the upper contacts of switches S—102, S—104 and S—106 through resistors R—140, R—142 and R—144, respectively, to be summed at terminal 138 of an amplifier A—146, to provide a sum voltage $V_{xe}$ in accordance with the following equation $$V_{xe} = V_p \cos \gamma - V_{WN} \cos \psi - V_{WE} \sin \psi \quad (15)$$

The $+V_{xe}$ voltage at output terminal 160 of amplifier A—146 represents the component of velocity of the aircraft in a horizontal plane with respect to a set of north-south and east-west axes fixed to the earth.

Switch S—134 and resistor R—164 effectively short capacitor 162 during simulated "airborne" conditions, so that A—146 is connected as a summing amplifier. If the sum input potential at terminal 138 is positive, the output voltage on the cathode of diode T—148 will be negative with respect to the potential on the diode anode and terminal 160 due to inversion by amplifier A—146, and hence diode T—148 will conduct, and a negative output voltage will appear at terminal 160. A negative voltage at terminal 160 will represent a forward ground velocity. If the resultant input voltage at terminal 138 becomes negative, as it might for example, when the simulated aircraft were parked with a simulated wind present, so that the $V_p \cos \gamma$ (horizontal component of airspeed) voltage at terminal 74 were zero and the wind component potentials at terminals 50 and/or 52 were negative, the cathode of diode T—148 will be driven positive, so that the diode will not conduct, and the voltage at terminal 160 will remain at zero. The described circuitry obviates the anomaly of wind blowing the simulated aircraft backwords. Inasmuch as aircraft never travel backwards during operations for which training is given, a positive voltage is never needed at terminal 160. When a positive voltage appears at the output terminal of amplifier A—146, diode 150 conducts, energizing neon lamp T—158 to indicate zero ground velocity.

When the simulated aircraft "lands," so that shaft S closes the lower contact of switch S—134, feedback resistor R—164 is disconnected, and amplifier A—146 operates as an integrating amplifier. The negative $V_{xe}$ voltage at terminal 160 is applied directly to terminal 166 and via resistor R—168 to amplifier A—170, having a feedback resistor R—172, to output terminal 174. In this way positive and negative values of the aircraft velocity along its X axis, as projected on the earth X axis, are made available for further computer use.

Turning now to consideration of the generation of the lateral component of aircraft velocity, it will be noted that during the period in which the aircraft is airborne, switches S—108, S—110 and S—112 will be closed in their upper positions, thereby applying to amplifier input terminal 182 a voltage via scaling resistor R—176 commensurate with the sidewise or lateral component of airspeed, and applying via scaling resistors R—178 and R—180 voltages commensurate with the sidewise components of the northerly and easterly components of wind velocity. The resultant voltage applied to amplifier A—184 thus varies in accordance with $-V_{ye}$, where:

$$-V_{ye} = V_p \beta \cos \gamma - V_{wn} \sin \psi + V_{we} \cos \psi \quad (16)$$

This equation does not take into account the effect of the various scaling resistors R—176, R—178, R—180, and R—188 on the actual magnitude of the quantity computed; however, it will be recognized by those skilled in the art that appropriate scale factors may be chosen to provide the desired output. Amplifier A—184 has an output at terminal 186 proportional to $+V_{ye}$ and has parallel feedback circuits comprising a resistor R—188 and switch S—136 which are in series with each other and in parallel with condenser 190 between terminals 182 and 186. As was the case with amplifier A—146, amplifier A—184 will function as a summing amplifier when the aircraft simulator is simulating its airborne condition and switch S—136 is in its upper position to provide amplifier A—184 with a feedback resistor. When the aircraft simulator is on the ground, and switches S—136 and S—137 are closed on their lower contacts, amplifier A—184 will operate as an integrator in conjunction with condenser 190.

The lateral velocity $V_{ye}$ of the aircraft as projected on an axis parallel to a tangent to the face of the earth, and as represented by the voltage appearing on terminal 186, is applied directly to terminal 192 and through resistor R—194, amplifier A—196, and feedback resistor R—198, for polarity inversion, to the output terminal 200.

The description of this invention thus far has been concerned principally with the production of voltages representative of various velocities of a simulated aircraft while it is airborne. A different set of factors must be considered when the simulated aircraft is on the ground, in the sense that there is weight on the wheels and the aircraft is no longer airborne. While the simulated aircraft is on the ground, the shaft S is adjusted by means of a relay or other switching device to move from the position shown in the figures so that all of the switches (shown in the figures as closed in their upper contact position) connected to shaft S are moved to their lower contact positions.

Turning first to FIG. 1 the shift of shaft S from the position shown will move switches 6 and 8 from their upper to their lower contacts and initiate a reversal of phase of the voltages appearing across the terminals of the resolver R—10 which will result in a reversal of phase throughout the apparatus of FIG. 1 and a change in the polarity of the wind component voltages appearing on terminals 50, 52, 54 and 56. The voltages appearing at these terminals will then be respectively $+V_{WN} \cos \psi$, $+V_{WE} \sin \psi$, $+V_{WN} \sin \psi$ and $-V_{WE} \cos \psi$. These sudden reversals of polarity do not mean, of course, that the simulated wind has suddenly reversed in direction, but, this reversal of phase is of value in certain computations which must be performed differently when the aircraft simulator is on the ground than when it is flying. The practical importance of this phase reversal is brought out most clearly in connection with the description of the airspeed servo in FIG. 4.

Operation of shaft S upon landing will be seen to remove the wind velocity longitudinal component voltages theretofore applied to A—146 via R—140 and R—142, and to substitute the longitudinal acceleration voltage $A_{xw}$ from terminal 60 for the horizontal airspeed voltage $V_p \cos \gamma$ therethrough applied via R—144. During simulated airborne flight closure of the feedback path through resistor R—164 will have prevented that A—146 circuit from freely integrating, but capacitor 162 will, at the moment of transition, be charged up to the instantaneous longitudinal earth-velocity $V_{xe}$; and upon landing and attendant transfer of switch S—134, amplifier A—146 will begin operating as a true integrator, beginning from an initial value determined by the charge on capacitor 162 and integrating the applied longitudinal acceleration voltage $A_{xw}$ with respect to time. Since capacitor 162 is permanently connected around amplifier A—146 and not switched, it will be clearly evident that no abrupt discontinuity can occur in the $-V_{xe}$ voltage at terminal 160 as the simulated aircraft lands or takes off.

In an actual aircraft landing, a prevailing wind does not, of course, disappear when the aircraft touches down, and although the longitudinal wind component voltages are disconnected (by switches S—102 and S—104) from amplifier A—146 upon touchdown, the effects of wind during ground travel are realistically simulated in the invention, since the same voltages, inverted in polarity, are applied elsewhere to the airspeed computing circuit, as will be described in connection with FIG. 4.

With switch S—106 of FIG. 2 closed in its lower position, the voltage $A_{xw}$ impressed on terminal 60 and representing the change in speed along the horizontal projection of the X wind axis of the aircraft or the acceleration along the X wind axis, is applied by way of resistors R—76 and R—80 through the lower contact of the switch S—106 and a resistor R—144 to the input terminal 138 of the integrating amplifier A—146. As was indicated in the preceding paragraph, the amplifier A—146 operates as an integrating amplifier when the resistor R—164 is removed from its feedback circuit and consequently the output appearing at terminal 160 is:

$$V_{xe} = \int_0^t A_{xw} dt \qquad (17)$$

The quantity $V_{xe}$, as mentioned above, is commensurate with longitudinal velocity of the simulated aircraft with respect to the ground. This voltage will appear at terminals 166 and 174 of FIGS. 2 and 3 with correct polarity, i.e., with a forward speed resulting in a negative voltage at terminal 160, since amplifier A—146 will provide inversion while operating as an integrator as well as when operating as a summing amplifier.

When the switches S—108, S—110, S—112, S—116, and S—118 break contact with their upper contacts and make contact with their lower contacts, the sidewise or lateral component of airspeed voltage theretofore applied to amplifier A—184 via switch S—108 and scaling resistor R—176 and the sidewise wind component voltages theretofore applied via S—110, S—112 and resistors R—178 and R—180 will be disconnected from amplifier A—184, and in lieu thereof the lateral aerodynamic acceleration voltage $A_{ys}$ and lateral wheel force component voltages are applied, via scaling resistors R—181 and R—183. At the same time, amplifier A—184 will be reconnected as an integrator, transfer of switch S—137 serving to connect capacitor 190 into the feedback path of amplifier A—184. At the moment of transition from air to ground, capacitor 190 will be charged up in accordance with instantaneous sidewise velocity, and upon touchdown A—184 will begin integrating from such an initial condition. Since an appreciable sidewise velocity during touchdown will cause a violent swerving of an actual aircraft, unless the aircraft is equipped with caster-type landing gear, which is quite rare, sidewise velocity is always maintained at a very small value immediately prior to landing, and the lateral wheel-ground reaction forces occurring upon touchdown quickly (after perhaps a slight sidewise skid) reduce sidewise velocity to zero. Thus the lateral wheel force voltages and the aerodynamic side-force voltages applied to amplifier A—184 will quickly discharge capacitor 190 after touchdown. A—184 appearing on terminal 186 will represent the integral of the voltages on terminals 64, 66, and 68, i.e.:

$$+V_{ye} = \int_0^t \left( A_{ys} + \frac{(T_{2L} + T_{2R}) + T_{2N} \cos \lambda N)}{W_t} \right) dt \qquad (18)$$

From the foregoing considerations, it is apparent that the voltages on the output terminals 166, 174, 192, and 200 of FIG. 2 will be accurately representative of ground speed of the simulator, whether it is operating in its airborne or its ground mode. It should be clear, also, that these output voltages can be utilized as control voltages for such things as display systems as well as to provide values of use in determining ground position and the simulated forces exerted on an aircraft simulator. In connection with an optical display system, these voltages are particularly useful, since they enable the accurate determination of ground speed and ground location so that the simulator always appears to be correctly oriented whether it is approaching a runway, landing, taking off, or taxiing on the ground.

The reorientation of the velocities $V_{xe}$ and $V_{ye}$ to magnitudes directed with reference to Cartesian coordinates running north and south and east and west on the ground may be accomplished by the circuitry of FIG. 3. The positive and negative values of $V_{xe}$ from FIG. 2 may be applied to like numbered terminals 174 and 166 and thence to a resolver, such as R—302. The wiper arms on the resolver are positioned in accordance with the aircraft heading $\psi$, by means of a shaft S—304, to provide voltages which may be proportional to $-V_{xe} \sin \psi$ and $-V_{xe} \cos \psi$. The positive and negative values of $V_{ye}$ may be applied through terminals 192 and 200 to a similar resolver-potentiometer R—306, the wiper arms of which are positioned by shaft S—308 in accordance with the aircraft heading $\psi$ with respect to the selected axes. The output voltages of resolver R—306 may then be proportional to $-V_{ye} \cos \psi$ and $+V_{ye} \sin \psi$.

The voltages $-V_{xe} \sin \psi$ and $-V_{ye} \cos \psi$ are then applied through resistors R—310 and R—312, respectively, to terminal 314 of amplifier A—316 having a feedback resistor R—318, to produce an output $V_E$ at terminal 320 which represents the ground velocity of the airplane directed along the east-west axis of a selected set of Cartesian coordinates.

The voltages $-V_{xe} \cos \psi$ and $+V_{ye} \sin \psi$ are applied through resistors R—322 and R—324, respectively, to terminal 326 of amplifier A—328 having a feedback resistor R—330. The output on terminal 332 of summing amplifier A—328 is thus forced to assume a magnitude proportional to the velocity of the aircraft in a north-south direction with respect to the above mentioned earth-oriented Cartesian coordinates. As was previously indicated, the voltages appearing at terminals 320 and 332 are useful in operating conventional ground position recorder and radio aids computers which require Cartesian coordinates in north and east components, as well as serving as input values for various optical display systems.

Servo amplifiers 334 and 336, together with indicators or recorders 338 and 340 will be understood to represent embodiments of indicating devices capable of showing velocity or position for which conventional counters, latitude-longitude meters, and other distance and/or velocity measuring devices may be provided without exceeding the spirit of the instant invention. It will be understood also that the voltages on terminals 320 and 332, as well as the shaft position presented by servo 334 and servo 336, may be utilized to activate indicators or recorders of various kinds as well as to control various elements of a simulator.

In FIG. 4 is shown apparatus for generating airspeed in which the value $A_{xw}$ is applied to terminal 402, where $A_{xw}$ represents the acceleration of the simulated aircraft along the horizontal projection of its X axis (or acceleration along the aircraft wind axes times $\cos \beta$ where $\cos \beta = 1$). This quantity is applied to switch S—404, via its upper contact, which will be closed when the aircraft is airborne by action of shaft S, through resistor R—406 to the input terminal 408 of amplifier A—410 which will operate during simulated airborne conditions in conjunction with feedback capacitor 412 as an integrating amplifier, to provide an output voltage $-V_p$ commensurate with simulated airspeed on terminal 414. The voltage or terminal 414 may operate a position servo such as 416 through input resistor R—418 and feedback resistor R—420, employing potentiometer R—422, which is positively excited, as a part of the follow-up system. While the aircraft simulator operates in its airborne mode, switches S—414, S—416, and S—418 will be maintained with their upper contacts closed so that no inputs will be provided from those switches to the amplifier A—410.

During simulated travel on the ground, amplifier A—410 will be reconnected by shaft S to operate as a summing amplifier rather than an integrator, the longitudinal acceleration input voltage $A_{xw}$ will be disconnected by switch S—404, the longitudinal ground velocity voltage $V_{xe}$ derived at terminal 174 (FIG. 2) as explained above will be applied via terminal 420 and scaling resistor R—426, and longitudinal wind component voltages from terminals 422 and 424 will be applied via scaling resistors R—428 and R—430. The wind component voltages at terminals 422 and 424 are applied from terminals 50 and 52 of FIG. 1, it being recalled that those voltages switch in polarity upon transition, by operation of switches 6 and 8 (FIG. 1). The use of switches 6 and 8 and provision of the longitudinal wind component voltages as positive voltages during simulated ground travel allows their direct application, without polarity inversion, to amplifier A—410, while still allowing amplifier A—410 to provide a negative output voltage during simulated forward travel.

It is necessary, in simulators for modern high speed aircraft, that the effects of sideslip angle $\beta$ be computed. For usual conditions of flight, the sideslip angle is small and the angular values, with small error, may be substituted for functions such as the tangent and sine. It is necessary, for accurate simulation, that sideslip be simulated in both the airborne and the ground modes of operation, and it has been ascertained that separate computations are necessary, since the conditions producing sideslip in the air are different than the corresponding conditions on the ground. When an aircraft is flying, the sideslip angle, which is caused by aerodynamic forces, gravity and engine thrust unbalance, may be expressed as follows:

$$\beta = \int_0^t (r_w - r_s) dt \qquad (20)$$

where $r_w$ represents the rate of turn of the wind axes of the aircraft simulated and $r_s$ represents the rate of turn of the stability axes of the aircraft simulated and where the difference between $r_w$ and $r_s$ indicates the rate of change of sideslip angle. On the ground, sideslip angle $\beta$ may be more realistically computed as a function of crosswind and airspeed; and $\beta$ (in radians, equal to the $\tan \beta$ for small angles) may be expressed in the following form:

$$\beta = \frac{-V_{WN} \sin \psi + V_{WE} \cos \psi}{V_p} \qquad (21)$$

where $-V_{WN} \sin \varphi + V_{WE} \cos \varphi$ represents cross wind velocity, and $V_p$ represents airspeed.

Turning to FIG. 5, in order to understand the manner in which sideslip angle is computed, we find the input terminals 502, 504, 506, and 508 upon which are impressed respectively, $-r_w$, $+r_s$, and two voltages $V_{WN} \sin \varphi$ and $-V_{WE} \cos \varphi$ commensurate with the sidewise components of wind corresponding in magnitude to those voltages present at terminals 54 and 56 (FIG. 1). The values $-r_w$ and $+r_s$ are applied directly to the upper terminals of switches S—510 and S—512, the contacts of which will be closed when the aircraft is airborne, and through resistors R—516 and R—518 to the input terminal 520 of amplifier A—522. Amplifier A—522 is equipped with a feedback capacitor C—524 and integrates the resultant input potential applied at terminal 520 to yield an output potential on terminal 526 proportional to $\beta$, in accordance with the relationship expressed in Equation (20).

When the aircraft simulator is operated in its ground mode, and has weight on its wheels, the sidewise wind velocity component voltages applied at terminals 506 and 508 are impressed through resistors R—530 and R—532, respectively, to the input terminal 534 of a summing amplifier A—536 and then through the lower contact of switch S—514, through resistor R—542 to terminal 520. The summing amplifier A—536, which acts as a polarity inverter, has a feedback resistor R—538 between its input terminal 534 and its output terminal 540. While the aircraft simulator operates in its airborne mode, the upper contact of switch S—514 is closed and the lower contact is open, so that the voltage representing lateral wind speed at terminal 540 was not applied to amplifier A—522. When the aircraft simulator lands, however, the upper contacts of switches S—510, S—512, S—514 and S—515 are opened and the lower contacts closed, thereby removing the inputs from terminals 502 and 504 from the input terminal 520 of amplifier A—522 and applying the output voltage of amplifier A—536 through the lower contact of switch S—514 to resistor R—542 and the input terminal 520 of amplifier A—522. Since the lower contact of switch S—515 is closed when the simulator is operating in the ground mode, amplifier A—522 will operate as a divider through potentiometer R—544 and resistor R—546. A shaft position proportional to airspeed $V_p$ is applied to the wiper arm of potentiometer R—544 by means of shaft S—548, so that the output of amplifier A—522 at terminal 526 is divided by a function proportional to $V_p$ in accordance with the requirements of Equation (21).

It will thus be seen that the output on terminal 526 is proportional to the sideslip angle $\beta$ during both modes of operation of the simulator. Since condenser C—524, besides operating as an integrator when the simulator of the aircraft is airborne, operates as a "memory" of the voltage existing between terminals 520 and 526 during the time of switchover from one mode of operation to the other, there is assured a continuous signal at terminal 526.

The voltage output on terminal 526 may be applied through a resistor such as R—550 to the input terminal 552 of a position servo 554, which will position itself in accordance with the value of $\beta$. In FIG. 5, the follow-up potentiometer excitation voltage necessary to stabilize the servo system is shown as a positive value at one terminal and a negative value at the other terminal of the potentiometer R—556. This provides feedback of the correct polarity when the wiper arm is positioned in accordance with either $+\beta$ or $-\beta$ through the feedback resistor R—558 to the input terminal 552 of the servo system. It will be recognized that certain other corrections are necessary to the servo system, such as rate feedback. Equipment for providing rate feedback is well-known and has been eliminated from this disclosure in the interest of simplicity. The output $\beta$ on shaft S—560 may be used to operate a $\beta$ indicator and to provide $\beta$ as a shaft position whenever required in a simulator, as in the computation of $V_{ye}$ in FIG. 2 of the instant disclosure.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letter Patent is:

1. Aircraft training apparatus for simulating the operation of a simulated aircraft during airborne and grounded travel and transitions therebetween; comprising in combination;

first means for deriving a first potential commensurate with the simulated component of horizontal airspeed of said simulated aircraft along the longitudinal axis of said simulated aircraft;

second means for providing a simulated heading quantity commensurate with heading of said simulated aircraft with respect to first and second reference geographical directions fixed with respect to the earth;

third means connected to said second means to be varied according to said heading quantity and including simulated wind velocity and wind direction controls for providing second potentials commensurate with the component of said wind velocity along the longitudinal axis of said aircraft;

and fourth means for combining said first and second potentials to provide a third potential commensurate with the component of aircraft ground speed in the heading direction of said simulated aircraft.

2. Apparatus according to claim 1 in which said third means also provides fourth potentials commensurate with the component of said wind velocity perpendicular to the longitudinal axis of said aircraft, in which said first means also provides fifth potentials commensurate with simulated lateral horizontal airspeed of said simulated aircraft; and which also includes fifth means for combining said fourth and fifth potentials to provide a sixth potential commensurate with the component of aircraft ground speed in a direction perpendicular to the heading direction of said simulated aircraft.

3. Apparatus according to claim 1 in which said third means comprises resolver means connected to be adjusted by said wind direction control and potentiometer means connected to be adjusted by said wind velocity control for deriving a fourth potential commensurate with the component of wind velocity in said first reference geographical direction and for deriving a fifth potential commensurate with the component of wind velocity in said second reference geographical direction, and further resolver means responsive to said heading quantity and said fourth and fifth potentials for providing said second potentials.

4. Apparatus according to claim 2 in which said third means comprises: resolver means connected to be adjusted by said wind direction control and potentiometer means connected to be adjusted by said wind velocity control for deriving a seventh potential commensurate with the component of wind velocity in said first reference geographical direction and for deriving an eighth potential commensurate with the component of wind velosity in said second reference geographical direction, and further resolver means responsive to said heading quantity and said seventh and eighth potentials for providing said third and fourth potentials.

5. Apparatus according to claim 2 having resolver means responsive to said heading quantity and said third and sixth potentials and operative to provide a seventh potential commensurate with the component of ground speed of said simulated aircraft in said first reference geographical direction and an eighth potential commensurate with the component of ground speed of said simulated aircraft in said second reference geographical direction.

6. Apparatus according to claim 2 in which said first means includes sideslip computer means operative to modify said first potential in accordance with simulated sideslip angle to provide said fifth potentials.

7. Apparatus according to claim 1 having switching means operable in accordance with transition between simulated airborne and simulated ground conditions; and means for deriving a simulated longitudinal acceleration potential; said fourth means comprising amplifier-integrator means controlled by said switching means to add said first and second potentials during simulated airborne conditions and to integrate said longitudinal acceleration potential with respect to time during simulated ground conditions, said switching means being operable to disconnect said longitudinal acceleration potential from said amplifier-integrator means during simulated airborne conditions and operable to disconnect said first and second potentials from said amplifier-integrator means during simulated ground conditions.

8. Apparatus according to claim 2 having switching means operable in accordance with transition between simulated airborne and simulated ground conditions and means for deriving a plurality of further potentials commensurate with lateral components of simulated wheel forces and aerodynamic side forces occurring during simulated ground travel, said fifth means comprising amplifier-integrator means controlled by said switching means to add said fourth and fifth potentials during simulated airborne conditions and to integrate said further potentials during simulated ground conditions, said switching means being operable to disconnect said further potentials from said amplifier-integrator means during simulated airborne conditions and operable to disconnect said fourth and fifth potentials from said amplifier-integrator means during simulated ground conditions.

9. Grounded trainer computer apparatus for providing a continuous output potential commensurate with a simulated aircraft velocity throughout transition between simulated airborne and simulated ground conditions, comprising in combination;

an amplifier having a first resistive feedback path and a second capacitive feedback path;

means for deriving a first potential commensurate with simulated velocity;

means for deriving a second potential commensurate with acceleration of said simulated aircraft;

switching means responsive to transition between simulated airborne and simulated ground conditions for selectively applying said first and second potentials to said amplifier, said switching means being operable to apply said first potential to said amplifier during simulated airborne conditions and to complete said first feedback path of said amplifier, said switching means being operable to apply said second potential to said amplifier during simulated ground conditions and to open said first feedback path, said second feedback path being connected during both simulated airborne conditions and simulated ground conditions.

10. Grounded trainer computer apparatus comprising in combination;

means for deriving first potentials commensurate with simulated total translational acceleration of said simulated aircraft along an axis of said aircraft;

means for deriving second potentials commensurate with components of simulated wind velocity along said axis;

means for deriving third potentials commensurate with horizontal airspeed of said simulated aircraft along said axis;

first and second amplifier-integrator circuits, each of said circuits comprising an amplifier selectively switchable between amplifying and integrating modes;

switching means for selectively switching said circuits between said modes upon transition between simulated airborne and simulated ground conditions, said switching means being operable to connect said first circuit as an amplifying circuit during simulated airborne conditions, to connect said first circuit as an integrating circuit during simulated ground conditions, to connect said second circuit as an integrating circuit during simulated airborne conditions and to connect said second circuit as an amplifying circuit during simulated ground conditions, said switching means being operable to apply said second and third potentials to said first circuit during simulated airborne conditions and to apply said first potentials to said first circuit during simulated ground conditions, said switching means being operable to apply said first potentials to said second circuit during simulated airborne conditions and to apply said second potentials and the output potential from said first circuit to said second circuit during simulated ground conditions.

11. Grounded trainer computer apparatus for continuously simulating the motion of an aircraft during grounded and airborne modes of simulated travel and throughout transition between said modes, comprising in combination;

means for deriving a first potential commensurate with a first flight condition of said simulated aircraft;

means for deriving a second potential commensurate with the time rate of change of said first flight condition of said simulated aircraft;

an amplifier-integrator unit switchably operative as an amplifier or as an integrator and to provide an output quantity;

switching means responsive to transition between said modes of simulated travel for selectively applying said first and second potentials to said amplifier-integrator unit and for selectively connecting said amplifier-integrator unit to operate as an amplifier or as an integrator, said switching means being operable to apply said first potential to said amplifier-integrator unit and to connect said unit to operate as an amplifier during a first of said modes of simulated travel and being further operable to apply said second potential to said unit and to connect said unit to operate as an integrator during the other of said modes of simulated travel.

12. Aircraft training computer apparatus for continuously simulating the operation of a simulated aircraft in the presence of a simulated wind during airborne and grounded travel and transitions therebetween, comprising in combination;

first means for deriving a first potential commensurate with the simulated horizontal component of velocity of said simulated aircraft along the longitudinal axis of said simulated aircraft;

second means for deriving a second potential commensurate with the simulated lateral horizontal component of velocity of said simulated aircraft;

third means for providing a simulated heading quantity commensurate with heading of said simulated aircraft with respect to simulated northerly and easterly reference geographical directions; first resolver means responsive to said heading quantity and including simulated wind velocity and wind direction controls for deriving third and fourth potentials commensurate respectively with the longitudinally-acting components of said wind velocity and for deriving fifth and sixth potentials whose vector sum is commensurate respectively with the laterally-acting component of said wind velocity;

first circuit means for summing said first, third and fourth potentials during simulated airborne conditions to provide a simulated longitudinal component of ground track potential; and second circuit means for summing said second, fifth and sixth potentials during simulated airborne conditions to provide a simulated lateral component of ground track potential.

13. Apparatus according to claim 12 having further means including further resolver means responsive to said heading quantity and said lateral and longitudinal ground track component potentials for providing simulated northerly and easterly ground track component potentials; and means responsive to said last-recited potentials for operating a ground track recorder.

14. Apparatus according to claim 12 having switching means operable in accordance with transitions between simulated airborne and simulated ground conditions;

a second airspeed computer means, said first means for deriving said first potential being responsive to said second airspeed computer means;

means responsive to said second airspeed computer means for deriving a simulated longitudinal acceleration potential;

said switching means being operable to connect said first circuit means as a summing means during simulated airborne flight and as an integrating means during simulated ground conditions, to connect said second airspeed computer means as an integrating means during simulated airborne flight and as a summing means during simulated ground conditions, to apply said first, third and fourth potentials to said first circuit means during simulated airborne flight and to apply said longitudinal acceleration potential to said first circuit means during simulated ground conditions, to apply said longitudinal acceleration potential to said second circuit means during simulated airborne flight, and to apply said third and fourth potentials and said longitudinal component of ground track potential to said second circuit means during simulated ground conditions.

15. Apparatus according to claim 14 in which said first and second circuit means and said second airspeed computer means each include a respective amplifier circuit having feedback circuits switchably controlled by said switching means to selectively connect said circuit means and said second airspeed computer means as summing circuits or as integrating circuits upon transition between simulated airborne and ground conditions.

References Cited in the file of this patent

UNITED STATES PATENTS

| | | |
|---|---|---|
| 2,475,314 | Dehmel | July 5, 1949 |
| 2,506,998 | Dehmel | May 9, 1950 |
| 2,536,495 | Ewing | Jan. 2, 1951 |
| 2,553,529 | Dehmel | May 15, 1951 |
| 2,554,155 | Rippere | May 22, 1951 |
| 2,560,527 | Dehmel | July 10, 1951 |
| 2,560,528 | Dehmel | July 10, 1951 |
| 2,731,737 | Stern | Jan. 24, 1956 |
| 2,811,788 | Gallo | Nov. 5, 1957 |